US006834902B2

(12) United States Patent
Agan

(10) Patent No.: US 6,834,902 B2
(45) Date of Patent: Dec. 28, 2004

(54) TRUCK BED EXTENSION

(76) Inventor: Richard Agan, 2850 Cr Sw3190, Winnsboro, TX (US) 75494

( * ) Notice: Subject to any disclaimer, the term of this patent is extended or adjusted under 35 U.S.C. 154(b) by 0 days.

(21) Appl. No.: 10/751,511

(22) Filed: Jan. 6, 2004

(65) Prior Publication Data

US 2004/0178649 A1 Sep. 16, 2004

Related U.S. Application Data

(60) Provisional application No. 60/454,355, filed on Mar. 14, 2003.

(51) Int. Cl.7 .................................................. B60R 9/06

(52) U.S. Cl. ................................ 296/26.08; 296/26.06; 224/405

(58) Field of Search ........................... 296/26.08, 26.09, 296/26.06; 224/405, 488, 495, 497, 499, 502, 518, 519, 521

(56) References Cited

U.S. PATENT DOCUMENTS

| | | | |
|---|---|---|---|
| 1,641,502 | A | 9/1927 | Price |
| 3,650,443 | A | 3/1972 | Haskett et al. |
| 3,724,694 | A | 4/1973 | Wilson |
| 4,234,284 | A | 11/1980 | Hauff |
| 4,695,218 | A | 9/1987 | Boyer |
| 4,813,584 | A | 3/1989 | Wiley |
| 4,906,015 | A | 3/1990 | LaCroix et al. |
| 4,915,276 | A | 4/1990 | Devito |
| 4,950,123 | A | 8/1990 | Brockhaus |
| 4,951,991 | A | 8/1990 | Haigler |
| 4,971,509 | A | 11/1990 | Sechovec et al. |
| 4,989,765 | A | 2/1991 | Huebner |
| 5,038,983 | A | 8/1991 | Tomososki |
| 5,067,640 | A | 11/1991 | Gaskill |
| 5,224,636 | A | 7/1993 | Bounds |
| 5,397,147 | A | 3/1995 | Ducharme et al. |
| 5,423,566 | A | 6/1995 | Warington et al. |
| 5,427,289 | A | 6/1995 | Ostor |
| 5,451,088 | A | 9/1995 | Broad |
| 5,458,389 | A | 10/1995 | Young |
| 5,560,666 | A | 10/1996 | Vieira et al. |
| 5,586,702 | A | 12/1996 | Sadler |
| 5,615,813 | A | 4/1997 | Ouellette |
| 5,678,743 | A | 10/1997 | Johnson et al. |
| 5,752,636 | A | 5/1998 | Manley |
| 5,820,004 | A | 10/1998 | Lane |
| 5,938,092 | A | 8/1999 | Johnson |
| 5,950,890 | A | 9/1999 | Darby |
| 6,050,627 | A | 4/2000 | Lee |
| 6,155,623 | A | 12/2000 | Lane |
| 6,213,492 | B1 | 4/2001 | Ceccarelli, III |
| 6,237,824 | B1 | 5/2001 | Bagley |
| 6,345,749 | B1 | 2/2002 | Hamilton |
| 2002/0109367 | A1 | 8/2002 | Terrusa |

FOREIGN PATENT DOCUMENTS

| | | |
|---|---|---|
| CA | 1304107 | 6/1992 |
| CA | 2153029 | 1/1996 |
| GB | 2 235 668 A | 3/1991 |

*Primary Examiner*—Joseph D. Pape
(74) *Attorney, Agent, or Firm*—Richard C. Litman

(57) ABSTRACT

A truck-bed extension adapted to attach to a truck with a truck gate and a hitch receiver. The truck-bed extension is formed primarily of removably connected sections of crafted tubing that can be assembled and disassembled by a single person. The truck-bed extension attaches to the truck hitch receiver without obstructing the gate regardless of the open or closed position of the gate. The truck-bed extension may also serve as a mobile work surface, such as a craftwork surface.

8 Claims, 4 Drawing Sheets

TRUCK BED EXTENSION

CROSS-REFERENCE TO RELATED APPLICATION

This application claims the benefit of U.S. Provisional Patent Application Ser. No. 60/454,355, filed Mar. 14, 2003.

BACKGROUND OF THE INVENTION

1. Field of the Invention

The present invention is directed to a truck-bed extension adapted to fit directly to a truck. More particularly, the invention is a truck-bed extension that can be easily assembled and disassembled by a single person.

2. Description of the Related Art

Generally, truck-bed extensions that attach directly to a trailer receiver are of limited size thus limiting what can be carried to but a few items, such as a couple of bicycles. A large truck-bed extension that can be easily assembled and disassembled by a truck driver, and stored on the back of a truck is unknown; as is an easily assembled and disassembled large truck-bed extension that can be easily adapted to provide a mobile work surface, such as a craft work surface, or a family eating table is also not known.

Several efforts have been made to address these and other problems. U.S. Pat. No. 4,695,218 issued Sep. 22, 1987 to E. W. Boyer, describes a carrier attachment for engaging a trailer hitch tailstock of a motor vehicle includes a tube segment supporting an electrical motor. The '218 carrier attachment requires an electric motor and is not suitable for easy assembly of disassembly by an ordinary truck driver.

U.S. Pat. No. 4,813,584 issued Mar. 21, 1989 to M. D. Wiley, describes a cargo carrier that attaches to a trailer hitch. While the cargo carrier is connected solely to the hitch, it is of limited size and is purchased as one piece. Thus, it is not easy to store in a box of limited dimensions and is not capable of easy assembly or disassembly and storage by e.g. a pickup truck driver. Thus, there is a need for a cargo carrier that is large enough to carry several items, and can be taken apart by a person and stored in a truck box for easy carriage on the vehicle when not in use.

U.S. Pat. No. 5,938,092 issued Aug. 17, 1999 to B. K. Johnson, describes a continuously curved drawbar adapted to be mounted in a receiver hitch for extending the bed of a transport vehicle and linked to L-shaped arms for carrying extended length loads. However, the '092 drawbar is entirely unsuitable for carrying e.g. a board or items that lack sufficient length to traverse the distance between the back of a truck and the L-shaped arms.

Other patents showing truck-bed extensions or cargo carriers, but which do not suggest a truck-bed extension according to the claimed invention, include U.S. Pat. No. 1,641,502 (Price), U.S. Pat. No. 3,650,443 (Haskett et al.), U.S. Pat. No. 3,724,694 (Wilson), U.S. Pat. No. 4,234,284 (Hauff), U.S. Pat. No. 4,906,015 (LaCroix et al.), U.S. Pat. No. 4,915,276 (Devito), U.S. Pat. No. 4,950,123 (Brockhaus), U.S. Pat. No. 4,951,991 (Haigler), U.S. Pat. No. 4,971,509 (Sechovec et al.), U.S. Pat. No. 4,989,765 (Huebner), U.S. Pat. No. 5,038,983 (Tomososki), U.S. Pat. No. 5,067,640 (Gaskill), U.S. Pat. No. 5,224,636 (Bounds), U.S. Pat. No. 5,397,147 (Ducharme et al.), U.S. Pat. No. 5,423,566 (Warrington et al.), U.S. Pat. No. 5,427,289 (Ostor), U.S. Pat. No. 5,451,088 (Broad), U.S. Pat. No. 5,458,389 (Young), U.S. Pat. No. 5,560,666 (Vieira et al.), U.S. Pat. No. 5,586,702 (Sadler), U.S. Pat. No. 5,615,813 (Ouellette), U.S. Pat. No. 5,678,743 (Johnson et al.), U.S. Pat. No. 5,752,636 (Manley), U.S. Pat. No. 5,820,004 (Lane), U.S. Pat. No. 5,950,890 (Darby), U.S. Pat. No. 6,050,627 (Lee), U.S. Pat. No. 6,155,623 (Lane), U.S. Pat. No. 6,213,492 B1 (Ceccarelli, III), U.S. Pat. No. 6,237,824 (Bagley), and U.S. Pat. No. 6,345,749 B1 (Hamilton).

Foreign patents showing truck-bed extensions or cargo carriers, but which do not suggest a truck-bed extension according to the claimed invention, include United Kingdom Patent No. GB 2,235,668 A, and Canadian Patent Nos. 1,304,107 and 2,153,029.

None of the above inventions and patents, taken either singly or in combination, is seen to describe the instant invention as claimed. Thus a truck-bed extension solving the aforementioned problems is desired.

SUMMARY OF THE INVENTION

A truck-bed extension adapted to attach to a truck with a truck gate and a hitch receiver. The truck-bed extension attaches to the truck hitch receiver without obstructing the gate regardless of the open or closed position of the gate. The truck-bed extension is also adapted for easy disassembly and assembly by a single person. The truck-bed extension is also adapted to serve as a mobile work surface, such as a craftwork surface.

It is an object of the invention to provide a truck-bed extension that attaches to a trailer receiver It is another object of the invention to provide a truck-bed extension that is of sufficient size to carry a number of different items such as hay, tools, fertilizer, and bicycles.

It is still another object of the invention to provide a truck-bed extension with a flat support for such activities as handyman work and family eating.

It is a further object of the invention to provide a truck-bed extension that is easily assembled and dissembled by a single person.

It is a further object of the invention to provide a truck-bed extension that is easily stored in a dissembled form.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed to a truck-bed extension 50 adapted to fit directly to a truck 60. More particularly, the invention is directed to a truck-bed extension 50 comprised primarily of sections of crafted tubing that can be assembled and disassembled by a single person 70. The terms "a single person" and "truck operator" are hereinafter regarded as equivalent terms.

Figure 1:
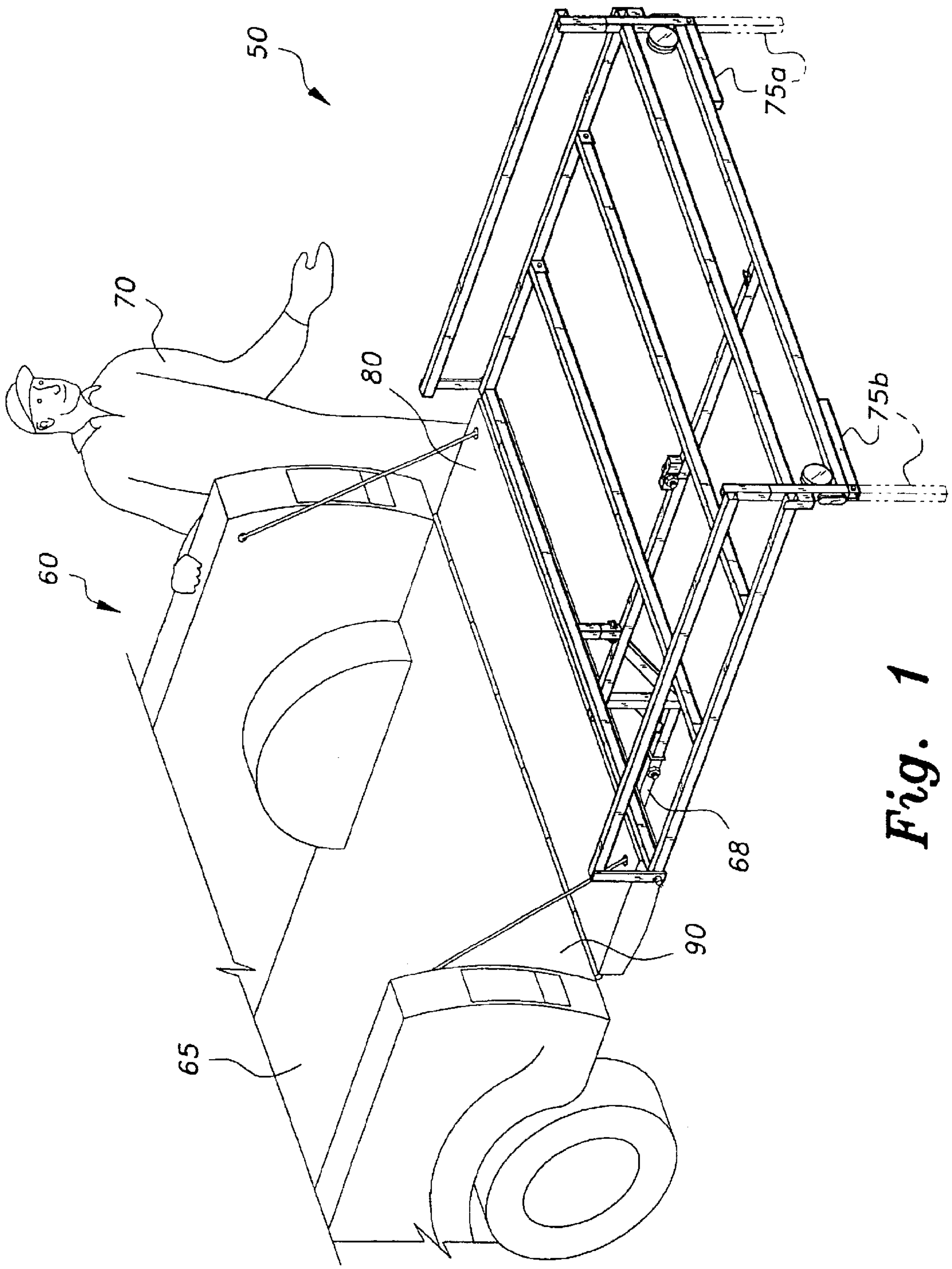
FIG. 1 is an environmental perspective view of a truck-bed extension according to the invention.

FIG. 1 shows an environmental perspective view of the truck-bed extension 50 attached to a truck 60, and more particularly to the truck's hitch receiver 68. The truck-bed extension 50 of the invention functions as an extension of the truck's bed 65. The truck 60 has a gate 80 pivotally attached to the rear end 90 of the truck 60. In common with other truck gates, the gate 80 is moveable between an open and closed position. The truck-bed extension 50 is adapted to avoid contact with the gate 80 regardless of the open or closed position of the gate 80. Thus, when the gate 80 is open items of greater length than the truck-bed 65 can be carried by laying them flat along the truck-bed 65, opened gate and truck-bed extension 50. Conversely, when the gate 80 is closed items can be carried on the truck-bed extension 50 independent from the truck-bed 65.

Figure 3A:
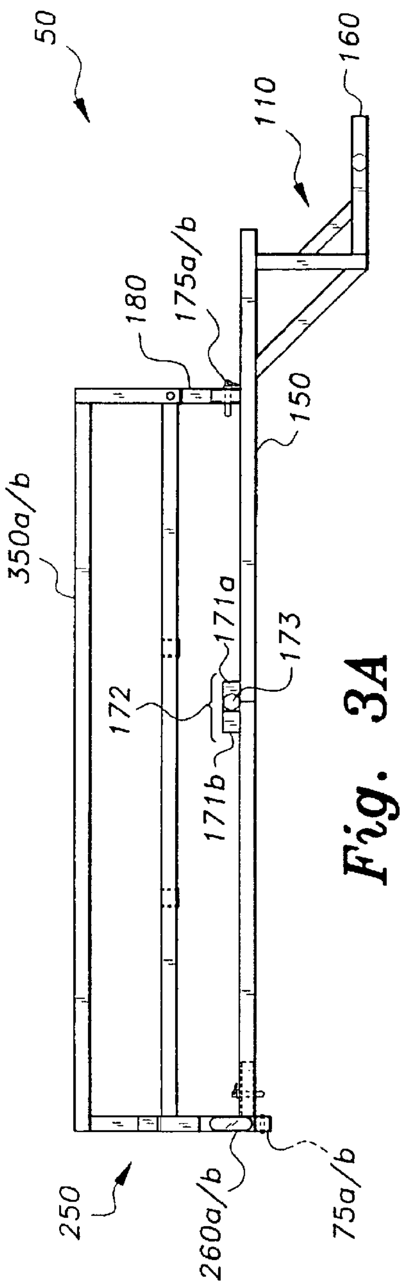
FIG. 3A is a side view of the truck-bed extension of FIG. 1 with a hinge joint.
Figure 3B:
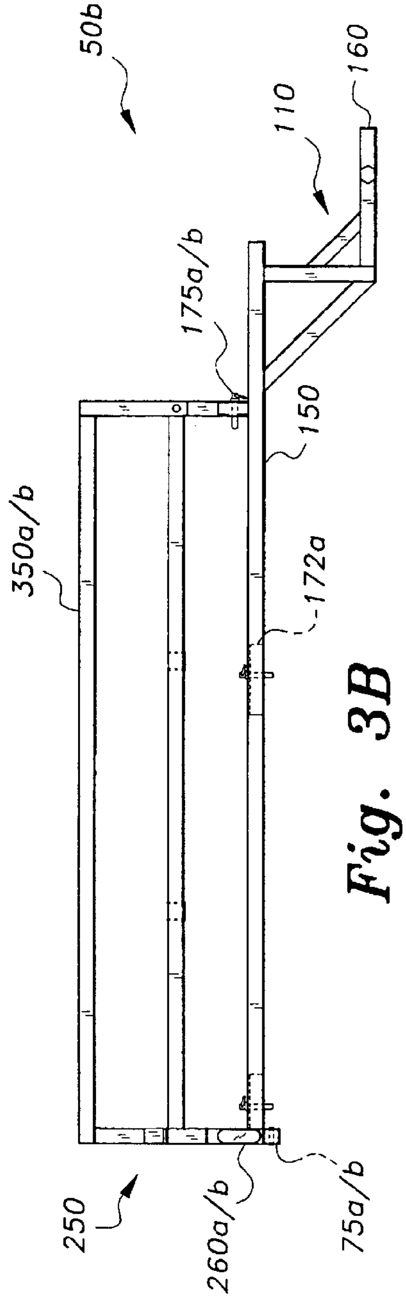
FIG. 3B is a side view of the truck-bed extension of FIG. 1 with a detachable telescopic connection.

Optional retractable legs 75*a* and 75*b* may be attached to the truck-bed extension as shown in FIGS. 1, 3A and 3B. The retractable legs 75*a* and 75*b* should only be deployed when the truck 60 is stationary. The addition of the optional retractable legs 75*a* and 75*b* add stability and enable the truck-bed extension 50 to be used, for example, as a stable platform or work top when the truck 60 is stationary.

Figure 2:
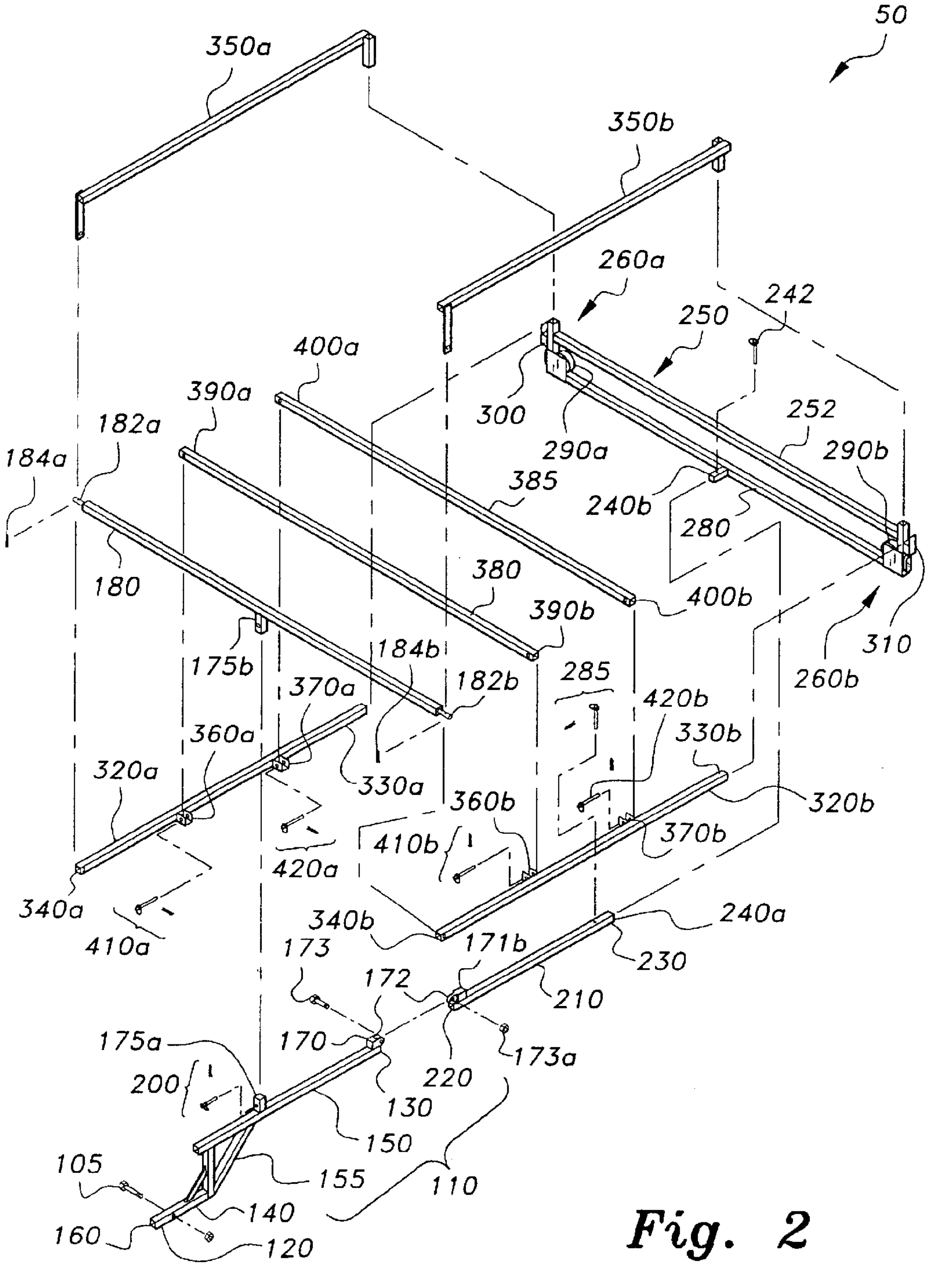
FIG. 2 is an exploded view of the truck-bed extension of FIG. 1.

With reference to FIG. 2, in general terms, the truck-bed extension 50 comprises a first support member 110 attached to a second support member 210 and a first T-bar 180, a rear support member 250 attached to the second support member 210, a first side support bar 320*a* and second side support bar 320*b* connecting the opposite ends 182*a* and 182*b* of the first T-bar 180 respectively with the opposite ends 300 and 310 of the rear support member 250, with a first cross-bar 380 and second cross-bar 385 connected to the side support bars 320*a* and 320*b*. Optional side railings 350*a* and 350*b* are removably attached to the ends of the T-bar 180 and rear support member 250.

The truck-bed extension 50 is attached to a truck hitch receiver 68 located on the underside of the rear end 90 of truck 60. More specifically, the truck-bed extension 50 comprises an elongated first support member 110 with first 120 and second 130 opposite ends. The first support member 110 further comprises a lower segment 140, an upper segment 150, and truss framework 155. The truss framework 155 joins the lower segment 140 to the upper segment 150 as shown in FIG. 2.

The lower 140 and upper 150 segments are generally lengths of tubing of sufficient gauge to resist e.g. lateral, vertical and twisting forces. However, the truck-bed extension 50 may comprise of one or more solid sections to give additional strength, particularly where large loads or heavy loads are to be carried on the truck-bed extension 50. The tubing is preferably of square cross-section, but may be made of circular cross-section. The tubing is preferably made of steel or any alloy of sufficient strength to carry loads up to a predetermined amount safely. However, it should be understood that the exact form of the tubing used in the first support member 110, and in any other part of the bed-extension of the present invention, may vary without detracting from the spirit of the invention.

Still referring to FIG. 2, the lower segment 140 has the first opposite end 120 wherein the first opposite end 120 defines a first attachment point 160. The upper segment 150 comprises the second opposite end 130 that in turn defines a second attachment point 170. The second attachment point 170 is adapted to receive a second support member 210. In the preferred embodiment, the second attachment point 170 comprises a first half 171*a* of hinged joint 172; a joint bolt 173; the joint bolt is ultimately secured to the second support member 210 (and more particularly to the second half 171*b* of the hinged joint 172) using a nut 173*a*. The upper segment 150 further comprises a first T-bar attachment point 175*a*; the first T-bar attachment point 175*a* may take a male or female form and likewise with regard to every attachment point described herein which can take a male or female form.

The first attachment point 160 of the first support member is secured the to the truck hitch point 68 using a hitch bolt 105. The lower segment 140 is of sufficient length to ensure a clearance between the gate 80 (especially when open) and the upper segment 150 of the first support member 110 thereby ensuring that the truck-bed extension 50 can be used when the gate 80 is closed or open.

The first T-bar 180 has a central attachment point 175*b*, wherein the central attachment point 175*b* is adapted to complement the first T-bar attachment point 175*a* on the upper segment 150 of the first support member 110. A cotter pin 200 or similar device is used to securely connect the first T-bar 180 to the first support member 110 wherein the first T-bar 180 forms a cross above the first support member 110. The T-bar 180 is substantially parallel with and at approximately the same height as the open gate 80 (see FIG. 1), and preferably parallel with and at the same height as first 380 and second 385 cross-bars. It should be understood that any suitable securing device may be used in place of the cotter pin 200. In addition, while it is important that the attachment points 175*a* and 175*b* complement each other, either attachment point can be female or male. The T-bar 180 further comprises a third 182*a* and fourth 182*b* opposite ends, which in turn define the length of the first T-bar 180.

An elongated tubular shaped second support member 210, has a third 220 and fourth 230 opposite ends. The third end 220 comprises a second half 171*b* of the hinged joint 172, which is secured the first half 171*a* of the hinged joint 172 using bolt parts 173 and 173*a*. Thus, the second support member 210 acts as a hinged extension of the first support member 110. The fourth opposite end 230 comprises a second T-bar attachment point 240*a* adapted to complement a third T-bar attachment point 240*b* on the rear support member 250; a hitch pin 242 (or any other suitable fastener) is used to secure complementary T-bar attachment points 240*a* and 240*b*.

The rear support member 250 has a fifth 260*a* and sixth 260*b* opposite ends, and comprises an upper bar 252. The fifth 260*a* and sixth 260*b* opposite ends define the length of the rear support member 250, and more particularly the upper bar 252.

The length of the upper bar 252 corresponds to the length of the first T-bar 180 as defined by the distance between its opposite ends 182*a* and 182*b*. The rear support member also comprises an integral second T-bar 280 with a second T-bar attachment point 240*b* that is used to attach the rear support member 250 to the second T-bar attachment point 240*a* using a cotter pin 285. It should be understood that any suitable securing pin or device might be used in place of the cotter pin 285. The integral T-bar 280 forms a perpendicular horizontal angle with respect to the second support member 210. The opposite ends 260*a* and 260*b* respectively comprise a U-bracket 300 and 310, respectively.

Optional rear facing lights 290*a* and 290*b* are shown attached to the ends 260*a* and 260*b* of the rear support member 250.

A first side bar 320*a* with opposite ends 330*a* and 330*b* and a second side support bar 320*b* with opposite ends 340*a* and 340*b*. The first 320*a* and second 320*b* side support bars connect the opposite ends 260*a* and 260*b* of the rear member 250 respectively to the opposite ends 182*a* and 182*b* of the first T-bar 180. The ends 330*a* and 330*b* rest on the U-brackets 260*a* and 260*b*, respectively, and the opposite ends 340*a* and 340*b* are respectively connected to the T-bar ends 182*a* and 182*b* using cotter pins 184*a* and 184*b*. Optional side railings 350*a* and 350*b* are similarly connected to the T-bar 180 and rear member 250 as shown in FIG. 2. The support bars 320*a* and 320*b* further comprise oppositely aligned U-brackets 360*a*, 360*b* and 370*a*, 370*b*, respectively. A first cross-bar 380 having opposite ends 390*a*, 390*b* and a second cross-bar 385 having opposite ends 400*a*, 400*b*, respectively, and are connected the support bars 320*a* and 320*b* as shown in FIG. 2. Specifically, the opposite ends 390*a* and 390*b* of the first cross bar 380 are attached to the U-brackets 360*a* and 360*b*; and opposite ends 400*a* and 400*b* of the second cross bar 385 are attached to the U-brackets 370*a* and 370*b*. Cotter pins 410*a*, 410*b* secure the opposite ends 390*a*, 390*b* of the cross-bar 380 to support bars 320*a* and 320*b*, respectively and cotter pins 420*a*, 420*b* secure opposite ends 400*a*, 400*b* of cross-bar 385 to support bars 320*a* and 320*b*, respectively.

Referring to FIG. 3A, which shows a side view of the truck-bed extension 50 of FIG. 1 with a hinge joint 172. The hinge joint 172 comprises a first half 171*a* and second half 171*b* that are welded to the respective ends 130 and 220 of the first 110 and second 210 support members. In normal operation, the support members 110 and 210 are held together by the joint bolt 173 (and nut 173*a*). When the truck-bed extension 50 is not in use, the members 110 and 210 can be folded with respect to each other thus reducing the length of the storage space required to store the parts of the truck-bed extension 50. As noted earlier, the truck-bed extension 50 can be used without the optional side railings 350*a* and 350*b*.

Referring to FIG. 3B, which shows a side view a different embodiment of the invention in the form of a truck-bed extension 50*a* wherein the hinge joint 172 is not used to connect the support members 110 and 210. In this embodiment, the support members 110 and 210 telescope into each other to provide a rigid and secure connection between the two parts. Either of ends 130*a* and 220*a* can act as the male or female member. As should be clear to a person of ordinary skill in the art of engineering, if the member end 130*a* of member 110 forms the male part then the end 130*a* should be sized to fit inside the end 220*a* and visa versa. It obviously follows that in this embodiment of the invention the female member, whether it be the end 130*a* or 220*a*, should be hollow and suitably sized to accept the male member (and conversely the complementary male member end should be suitably sized to fit inside the female member). A connecting pin 174 may be used to keep ends 130*a* and 220*a* securely attached to each other. If the connecting pin 174 is used, then the ends 130*a* and 220*a* should define appropriate through-holes to accommodate the connecting pin 174. As a general point, it should be understood that the pins used in either embodiment may be replaced with any suitable fastening device.

Figure 4:
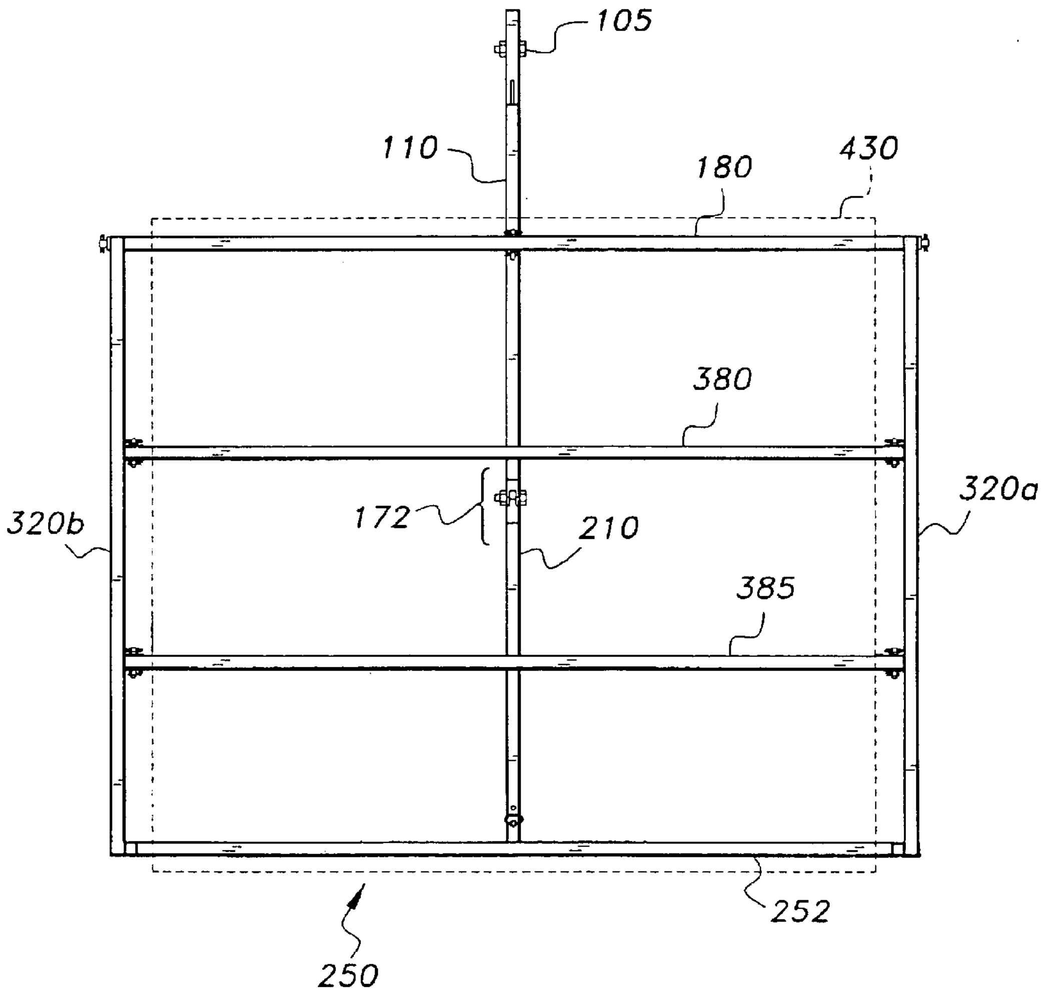
FIG. 4 is a top view of the truck-bed extension of FIG. 1.

FIG. 4 shows a top view of the truck-bed extension 50 of FIG. 1. The members 252, 380 and 385 act as the support members of the truck-bed extension 50 of the invention; the members 252, 380 and 385 are preferably at substantially the same elevation as the truck gate 80 (i.e., specifically when the gate 80 is in an open position). A flat board 430 (shown as a dashed line) can be placed on the members 252, 380 and 385 to provide a platform on which to place items for transport such as bales of hay, sacks of fertilizer, gardening or farming implements etc. The flat board 430 may be made or wood, light metal alloy, or any suitable plastic. The flat board 430 may form a permanent part of the truck-bed extension 50. The flat board 430 may also be used as a work platform by a skilled artisan or craftsmen when the truck 60 is stationary, preferably with the optional retractable legs 75*a* and 75*b* fully deployed. Other items such as cycles and large toys may be laid flat and tied directly to the members 252, 380 and 385, or on the optional board 430. Thus, it should be clear that the truck-bed extension 50 may be used in a number of different ways. It is to be understood that the present invention is not limited to the embodiments described above, but encompasses any and all embodiments within the scope of the following claims.

I claim:

1. A truck-bed extension removably attachable to a hitch receiver on a truck having a rear gate without obstructing the gate in either the open or closed positions that is easily assembled and disassembled by a single person, comprising:

an elongated first support member having a first end and a second end, said first support member including a lower segment and an upper segment joined by truss framework;

means for removably connecting said first end of said first support member to a hitch receiver an elongated second support member having a first end and a second end;

means for pivotally connecting said second end of said first support member to said first end of said second support member;

a first T-bar having a first end and a second end;

means for removably connecting said T-bar to said first support member;

a rear support member having a first end and a second end;

means for removably connecting said rear support member to said second end of said second support member;

a first elongated side support bar having a first end and a second end and a second elongated side support bar having a first end and a second end;

means for removably connecting said first end of said first side support bar to said first end of said T-bar;

means for removably connecting said first end of said second side support bar to said second end of said T-bar;

means for removably connecting said second end of said first side support bar to said first end of said rear support member;

means for removably connecting said second end of said second side support bar to said second end of said rear support member;

a first cross-bar having a first end and a second end and a second cross-bar having a first and a second end; and means for removably connecting said first ends of said first and second cross-bars to said first side support bar and said second ends of said first and second cross-bars to said second side support bar.

2. The truck-bed extension according to claim 1, wherein said rear support member comprises a second T-bar and an integral upper bar at the elevation of said first T-bar.

3. The truck-bed extension according to claim 2, wherein said means for removably connecting said second end of said second support member to said rear support member connects said second end of said second support member to said second T-bar.

4. The truck-bed extension according to claim 3, wherein said means for removably connecting said second end of said first side support bar to said first end of said rear support member includes a first U-shaped bracket and said means for removably connecting said second end of said second side support bar to said second end of said rear support member includes a second U-shaped bracket.

5. The truck-bed extension according to claim 4, wherein said means for removably connecting said first ends of said first and second cross-bars to said first side support bar and said second ends of said first and second cross-bars to said second side support bar includes U-brackets and cotter pins.

6. The truck-bed extension according to claim 5, further including a pair of retractable legs, a first leg pivotally attached to said first end of said rear support member and a second leg pivotally attached to said second end of said rear support member.

7. The truck-bed extension according to claim 5, further including elongated side railings, each side railing having first and second ends;

means for removably connecting the first ends of said railings to said first and second ends of said first T-bar; and means for removably connecting said second ends of said railings to said first and second ends of said rear support member.

8. The truck-bed extension of claim 7, wherein said means for pivotally connecting said second end of said first support member to said first end of said second support member comprises a hinged joint.

* * * * *